US010348511B1

United States Patent
Bagg (10) Patent No.: US 10,348,511 B1
(45) Date of Patent: Jul. 9, 2019

(54) METHODS AND APPARATUS FOR ESTABLISHING ENERGY-EFFICIENT ETHERNET LINK

(71) Applicant: Marvell Israel (M.I.S.L) Ltd., Yokne'am (IL)

(72) Inventor: Ori Bagg, Mazkeret Batya (IL)

(73) Assignee: Marvell International, Ltd., Hamilton (BM)

( * ) Notice: Subject to any disclaimer, the term of this patent is extended or adjusted under 35 U.S.C. 154(b) by 0 days.

(21) Appl. No.: 15/913,475

(22) Filed: Mar. 6, 2018

Related U.S. Application Data (60) Provisional application No. 62/469,332, filed on Mar. 9, 2017.

(51) Int. Cl.
  *H04L 12/24* (2006.01)
  *H04L 12/12* (2006.01)
  *G06F 1/32* (2019.01)

(52) U.S. Cl.
  CPC ............ *H04L 12/12* (2013.01); *G06F 1/32* (2013.01)

(58) Field of Classification Search
  CPC .......................... H04L 1/0833; G06F 1/32
  See application file for complete search history.

(56) References Cited

U.S. PATENT DOCUMENTS

| | | | |
|---|---|---|---|
| 2009/0185565 A1* | 7/2009 | Diab | H04L 12/40039 370/394 |
| 2011/0029796 A1* | 2/2011 | Matthews | H04L 12/12 713/323 |
| 2011/0191608 A1* | 8/2011 | Vetteth | G06F 15/16 713/310 |

OTHER PUBLICATIONS

IEEE Std 802.3az™-2010 (Amendment to IEEE Std 802.3™-2008), IEEE Computer Society, "Part 3: Carrier Sense Multiple Access with Collision Detection (CSMA/CD) Access Method and Physical Layer Specifications, Amendment 5: Media Access Control Parameters, Physical Layers, and Management Parameters for Energy-Efficient Ethernet", pp. 1-272, Oct. 27, 2010.

IEEE Std 802.1AB™-2009 (Revision of IEEE Std 802.1AB-2005), IEEE Computer Society, "Station and Media Access Control Connectivity Discovery", pp. 1-190, Sep. 17, 2009.

* cited by examiner

*Primary Examiner* — Ayanah S George (57) ABSTRACT

A method for operating an energy-efficient Ethernet transceiver system includes establishing an initial link between a local transceiver at a local host and a remote transceiver at a remote host, receiving, at the local transceiver, initial data from the remote transceiver regarding energy-efficient Ethernet capabilities of the remote transceiver, and storing, in a first data storage location, the initial data from the remote transceiver regarding energy-efficient Ethernet capabilities of the remote transceiver that are shared by the local transceiver. Additional data is received at the local transceiver from the remote host regarding all energy-efficient Ethernet capabilities of the remote transceiver. The additional data is stored in a data storage location separate from the first data storage location. Based on at least the additional data, the local host identifies a remote transceiver that is capable of an energy-efficient Ethernet link and establishes that link through a local transceiver.

20 Claims, 2 Drawing Sheets

METHODS AND APPARATUS FOR ESTABLISHING ENERGY-EFFICIENT ETHERNET LINK

CROSS REFERENCE TO RELATED APPLICATION

This claims the benefit of, commonly-assigned U.S. Provisional Patent Application No. 62/469,332, filed Mar. 9, 2017, which is hereby incorporated by reference herein in its entirety.

FIELD OF USE

This disclosure relates to devices using a link-layer discovery protocol in which energy-efficient Ethernet capabilities are advertised, and systems including such devices, as well as methods of operating such devices and systems.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the present disclosure.

Communication links operating under the IEEE 802.3 standard, commonly referred to as "Ethernet," may include a feature known as Energy-Efficient Ethernet ("EEE") that allows link partners to save energy, if the physical layer transceivers (PHYs) of both link partners support EEE at the speed at which the link is established.

An EEE link achieves energy savings by having each PHY enter a low-power-idle (LPI) mode. When a PHY is in LPI mode, the PHY cannot transmit or receive regular data signals, but only "sleep" and "refresh" (or "wake") signals. Each PHY on an EEE link will enter LPI mode after a predetermined interval (the LPI "enter time-out") of inactivity following a "sleep" signal sent by that PHY (to give time for any link-partner PHY that wants to transmit to so do before the first PHY times out and enters LPI mode). When one of the PHYs on a link that is in LPI mode needs to start transmitting, it first transmits a "refresh" signal, and then waits for a predetermined period (the LPI "exit time-out") to elapse (to give time for the link-partner PHY to also awaken) before it exits from LPI mode and starts transmitting regular data traffic. Values of the enter time-out and the exit time-out are specified in a type-length-value (TLV) frame according to the link-layer discovery protocol (LLDP) set forth in the IEEE 802.3az standard.

The PHYs on a link exchange EEE capabilities as part of the auto-negotiation process during which the link is set up. During that auto-negotiation process, each respective PHY transmits to each other PHY on the link its own EEE capabilities, including the speed(s) at which that respective PHY is capable of supporting an EEE link. Each PHY stores the EEE capabilities of each other PHY on the link, but only to the extent that the PHY itself is capable of EEE. The host to which any local PHY on the link is connected can examine the data identifying those capabilities of remote PHYs as stored by each local PHY of that host, and can use that capability data to rearrange links between itself and other hosts into a more efficient configuration, but that data, stored by individual local PHYs, identifying EEE capabilities of remote PHYs, will not include data regarding EEE capabilities of a link-partner PHY of a local PHY that that local PHY cannot itself support.

SUMMARY

A method according to implementations of the subject matter of this disclosure, for operating an energy-efficient Ethernet transceiver system, includes establishing an initial link between a first local transceiver and a first remote transceiver at a remote host, receiving, at the first local transceiver, initial data from the first remote transceiver regarding energy-efficient Ethernet capabilities of the first remote transceiver, storing, in a first data storage location, the initial data from the first remote transceiver regarding energy-efficient Ethernet capabilities of the first remote transceiver that are shared by the first local transceiver; receiving, at the first local transceiver, additional data from the remote host regarding all energy-efficient Ethernet capabilities of the first remote transceiver, and storing, in a data storage location separate from the first data storage location, the additional data from the remote host regarding energy-efficient Ethernet capabilities of the first remote transceiver.

In such an implementation, the storing the additional data may include storing the additional data from the remote host regarding all energy-efficient Ethernet capabilities of the first remote transceiver. Alternatively, in such an implementation, the storing the additional data may include storing the additional data from the remote host regarding energy-efficient Ethernet capabilities of the first remote transceiver that are not shared by the first local transceiver.

Such an implementation may further include determining, by a local host of the first local transceiver, whether the initial link is an energy-efficient Ethernet link, and, when the initial link is determined not to be an energy-efficient Ethernet link, identifying, by the local host, based on at least the additional data, a remote transceiver that is capable of an energy-efficient Ethernet link and establishing, by the local host, of an energy-efficient Ethernet link with the identified remote transceiver.

According to that implementation, the method may further include storing, at at least one additional separate data storage location, other additional data from at least one other remote transceiver regarding energy-efficient Ethernet capabilities of the at least one other remote transceiver, where the identifying, by the local host, based on at least the additional data, a remote transceiver that is capable of an energy-efficient Ethernet link, includes identifying, by the local host, based on at least the additional data and the other additional data, a remote transceiver from among the first remote transceiver and the first other remote transceiver, that is capable of an energy-efficient Ethernet link.

A method, according to other implementations of the subject matter of this disclosure, for operating an energy-efficient Ethernet transceiver system, includes establishing an initial link between a first transceiver at a first host and a first transceiver at a second host, receiving, at the first transceiver at the first host, first initial data from the first transceiver at the second host regarding energy-efficient Ethernet capabilities of the first transceiver at the second host, receiving, at the first transceiver at the second host, second initial data from the first transceiver at the first host regarding energy-efficient Ethernet capabilities of the first transceiver at the first host, storing, in a first data storage location at the first host, the first initial data from the first transceiver at the second host regarding energy-efficient Ethernet capabilities of the first transceiver at the second host that are shared by the first transceiver at the first host, storing, in a second data storage location at the second host, the first initial data from the first transceiver at the first host regarding energy-efficient Ethernet capabilities of the first transceiver at the first host that are shared by the first transceiver at the second host, receiving, at the first transceiver at the first host, first additional data from the second host regarding all energy-efficient Ethernet capabilities of the first transceiver at the second host, receiving, at the first transceiver at the second host, second additional data from the first host regarding all energy-efficient Ethernet capabilities of the first transceiver at the first host, storing, in a first additional data storage location at the first host separate from the first data storage location at the first host, the first additional data from the second host regarding energy-efficient Ethernet capabilities of the first transceiver at the second host, and storing, in a second additional data storage location at the second host separate from the second data storage location at the second host, the second additional data from the first host regarding energy-efficient Ethernet capabilities of the first transceiver at the first host.

According to such an implementation, the storing the first additional data may include storing the first additional data from the second host regarding all energy-efficient Ethernet capabilities of the first transceiver at the second host. In that implementation, the storing the second additional data may include storing the second additional data from the first host regarding all energy-efficient Ethernet capabilities of the first transceiver at the first host. Alternatively, the storing the first additional data may include storing the first additional data from the second host regarding energy-efficient Ethernet capabilities of the first transceiver at the second host that are not shared by the first transceiver at the first host.

In that implementation the storing the second additional data may include storing the second additional data from the first host regarding energy-efficient Ethernet capabilities of the first transceiver at the first host that are not shared by the first transceiver at the second host.

That implementation may further include determining, by the first host, whether the initial link is an energy-efficient Ethernet link, and when the initial link is determined not to be an energy-efficient Ethernet link, identifying, by the first host, based on at least the first additional data, a remote transceiver at the second host that is capable of an energy-efficient Ethernet link and establishing, by the first host, of an energy-efficient Ethernet link with the identified remote transceiver at the second host.

A variant of that implementation may further include storing, at at least one other first additional separate data storage location, other first additional data from the second host regarding energy-efficient Ethernet capabilities of at least one other transceiver at the second host. The identifying, by the first host, based on at least the first additional data, a remote transceiver at the second host that is capable of an energy-efficient Ethernet link, may include identifying, by the first host, based on at least the first additional data and the first other additional data, a remote transceiver at the second host from among the first transceiver at the second host and the at least one other transceiver at the second host, that is capable of an energy-efficient Ethernet link.

The implementation may further include determining, by the second host, whether the initial link is an energy-efficient Ethernet link, and when the initial link is determined not to be an energy-efficient Ethernet link, identifying, by the second host, based on at least the second additional data, a remote transceiver at the first host that is capable of an energy-efficient Ethernet link and establishing, by the second host, of an energy-efficient Ethernet link link with the identified remote transceiver at the first host.

Such an implementation may further include storing, at at least one other second additional separate data storage location, other second additional data from the first host regarding energy-efficient Ethernet capabilities of at least one other transceiver at the first host. The identifying, by the second host, based on at least the second additional data, a remote transceiver at the first host that is capable of an energy-efficient Ethernet link, includes identifying, by the second host, based on at least the second additional data and the second other additional data, a remote transceiver at the first host from among the first transceiver at the first host and the at least one other transceiver at the first host, that is capable of an energy-efficient Ethernet link.

An energy-efficient Ethernet transceiver system according to a further implementation of the subject matter of this disclosure includes a first host having a first transceiver and at least one other first transceiver, and a second host having a second transceiver and at least one other second transceiver. Each respective one of the first transceiver, the at least one other first transceiver, the second transceiver and the at least one other second transceiver, has a respective set of energy-efficient Ethernet capabilities. Each respective one of the first transceiver and the at least one other first transceiver has a respective first data storage location for storing initial data received from a respective one of the second transceiver and the at least one other second transceiver, regarding energy-efficient Ethernet capabilities of the respective one of the second transceiver and the at least one other second transceiver that the respective one of the first transceiver and the at least one other first transceiver also is capable of. Each respective one of the second transceiver and the at least one other second transceiver has a respective second data storage location for storing initial data received from a respective one of the first transceiver and the at least one other first transceiver, regarding energy-efficient Ethernet capabilities of the respective one of the first transceiver and the at least one other first transceiver that the respective one of the second transceiver and the at least one other second transceiver also is capable of. Each respective one of the first transceiver and the at least one other first transceiver has a respective first additional data storage location for storing additional data received from the second host, regarding energy-efficient Ethernet capabilities of a respective one of the second transceiver and the at least one other second transceiver, regardless of whether the respective one of the first transceiver and the at least one other first transceiver also has those capabilities. Each respective one of the second transceiver and the at least one other second transceiver has a respective second additional data storage location for storing additional data received from the first host, regarding energy-efficient Ethernet capabilities of a respective one of the first transceiver and the at least one other first transceiver, regardless of whether the respective one of the second transceiver and the at least one other second transceiver also has those capabilities.

In such an implementation, the first host may include first processing circuitry, and when an initial link is established between (a) one of (1) the first transceiver and (2) one of the at least one additional first transceiver at the first host, and (b) one of (1) the second transceiver and (2) one of the at least one additional second transceiver at the second host, the first processing circuitry of the first host may determine whether the initial link is an energy-efficient Ethernet link, and when the initial link is determined not to be an energy-efficient Ethernet link, may identify, based on at least the first additional data, a remote transceiver at the second host that is capable of an energy-efficient Ethernet link, and may establish an energy-efficient Ethernet link with the identified remote transceiver at the second host.

In that implementation, the first processing circuitry of the first host may base identification of the remote transceiver at the second host also on other first additional data from another of the at least one other second transceiver.

In such an implementation, the second host may include second processing circuitry, and when an initial link is established between (a) one of (1) the first transceiver and (2) one of the at least one additional first transceiver at the first host, and (b) one of (1) the second transceiver and (2) one of the at least one additional second transceiver at the second host, the second processing circuitry of the second host may determine whether the initial link is an energy-efficient Ethernet link, and when the initial link is determined not to be an energy-efficient Ethernet link, may identify, based on at least the second additional data, a remote transceiver at the first host that is capable of an energy-efficient Ethernet link, and may establish an energy-efficient Ethernet link with the identified remote transceiver at the first host.

In that implementation, the second processing circuitry of the second host may base identification of the remote transceiver at the second host also on other second additional data from another of the at least one other first transceiver.

In such an implementation, the first host may include first processing circuitry, the second host may include second processing circuitry, and when an initial link is established between (a) one of (1) the first transceiver and (2) one of the at least one additional first transceiver at the first host, and (b) one of (1) the second transceiver and (2) one of the at least one additional second transceiver at the second host, a respective one of (a) the first processing circuitry of the first host, and (b) the second processing circuitry of the second host may determine whether the initial link is an energy-efficient Ethernet link, and when the initial link is determined not to be an energy-efficient Ethernet link, may identify, based on at least a respective one of the first additional data and the second additional data, a remote transceiver, at a respective one of the second host and the first host, that is capable of an energy-efficient Ethernet link, and may establish an energy-efficient Ethernet link with the identified remote transceiver at the respective one of the second host and the first host.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

As set forth above, the PHYs on a data link, such as an Ethernet link, exchange EEE capabilities as part the auto-negotiation process during which the link is set up. During that auto-negotiation process, each respective PHY transmits to each remote PHY on the link its own EEE capabilities, including the speed(s) at which that respective PHY is capable of supporting an EEE link. Each respective PHY stores the EEE capabilities of each remote PHY on the link, but only to the extent that the respective PHY itself is capable of EEE. For purposes of this discussion and the claims which follow, any particular PHY may be referred to as a "local" PHY when it is the PHY under consideration (such as a PHY whose host is seeking to set up or improve its connections to other hosts) or another PHY connected to the same host, and as a "remote" PHY when it is not connected to the same host as the "local" PHY.

In energy-efficient Ethernet according to the aforementioned IEEE 802.3az standard, which is hereby incorporated by reference herein in its entirety, the host to which any local PHY on the link is connected can examine the data identifying those capabilities of remote PHYs as stored by the local PHYs of the host, and can use that capability data to rearrange links between itself and other hosts into a more efficient configuration. However, that data, stored by individual local PHYs, identifying EEE capabilities of remote PHYs, will not include data regarding EEE capabilities of a link-partner PHY of a local PHY that that local PHY cannot itself support. For example, if a local PHY can support EEE at three different speeds, and a remote PHY can support EEE at two out of those three speeds and at two other speeds that the local PHY cannot support—e.g., because those other speeds (or at least EEE at those speeds), were not available when the local PHY was manufactured—then the local PHY will store the fact that the remote PHY can support EEE at the two speeds at which the local PHY also can support EEE, but will not store the fact that the remote PHY can support EEE on the two speeds at which the local PHY cannot support EEE.

As a more particular example, consider a particular PHY that supports EEE at 100 Mbps, 1 Gbps and 10 Gbps, but does not support EEE at 2.5 Gbps or 5 Gbps. If that particular PHY, in its role as the local PHY, negotiates a link with a remote PHY that supports EEE at, say, 1 Gbps, and also at 2.5 Gbps or 5 Gbps or both, the local PHY will store, in an appropriate data storage location accessible to its host, the fact that the remote PHY supports EEE at 1 Gbps, but not the fact that the remote PHY supports EEE at 2.5 Gbps or 5 Gbps. As a result, when the host of the local PHY examines the appropriate data storage locations of its local PHYs to determine the EEE capabilities of all remote PHYs to which its local PHYs are connected, with the aim of potentially increasing the efficiency of its network by redistributing connections among its local PHYs to better match the EEE capabilities of remote PHYs, the host will not be aware of the 2.5 Gbps EEE capability or the 5 Gbps EEE capability of the remote PHY that is partnered with the particular local PHY, because the particular local PHY, being incapable of supporting 2.5 Gbps EEE or 5 Gbps EEE, will not have stored the fact that its link-partner PHY supports 2.5 Gbps EEE or 5 Gbps EEE.

Therefore, in accordance with implementations of the subject matter of this disclosure, during the auto-negotiation process, PHYs on a data link exchange, according to existing standards, EEE capabilities that they are capable of. After the auto-negotiation process is complete, the host of each PHY on the link sends, via its respective PHY on the link, an additional type-length-value (TLV) data frame that includes the EEE capabilities that the sending PHY has, even if the receiving PHY lacks those capabilities.

Each receiving PHY stores, in a location according to existing standards, the EEE capabilities of the sending PHY that the receiving PHY also is capable of, as exchanged during auto-negotiation. The location according to existing standards typically is a first data storage location in, or associated with, each receiving PHY.

Each receiving PHY also stores, in a different data storage location, the EEE capabilities that the sending PHY has, as determined from the received additional TLV data frame sent by the remote host according to this disclosure. In some implementations, data from the received additional TLV data frame is stored, in a separate data storage location, in its entirety. In other implementations, the only data from the received additional TLV data frame that is stored is data that relates to capabilities that the receiving PHY does not share.

In one variant of such other implementations, the data from the received additional TLV data frame is compared to the data previously stored (e.g., the data received during auto-negotiation) regarding the capabilities of the sending PHY that are shared by the local PHY, and any duplicate listings are skipped when storing data from the received additional TLV data frame. In another variant of such other implementations, the data from the received additional TLV data frame is examined, without regard to the data previously stored regarding the capabilities of the sending PHY that are shared by the local PHY, for references to EEE capabilities that the receiving PHY does not share, and only those EEE capabilities that the receiving PHY is not capable of are stored in the separate data storage location.

Either variant of such other implementations would require the receiving PHY to be aware that there may exist EEE capabilities that it itself lacks, and further require additional processing. Therefore, it may be easier to simply store the data from the received additional TLV frame in its entirety in the separate data storage location, even though the data may be duplicative of other data already stored by the local PHY.

When data from the received additional TLV data frame is stored in the separate data storage location according to any of the aforementioned implementations, the host of the receiving PHY can access all data necessary to determine the EEE capabilities of the link-partner PHYs of all of the local PHYs attached to that host, insofar as, except in the case of the very first link established, there will have been other links previously established during which other additional TLV frames regarding EEE capabilities of other remote PHYs will have been received and stored. In implementations where the data from the received additional TLV data frame is stored in the separate data storage location in its entirety, the host need examine only each of the separate data storage locations to identify the EEE capabilities of all of the link-partner PHYs. In implementations where, from among the data from the received additional TLV data frame, the only data that is stored in the separate data storage locations is data regarding those EEE capabilities that the receiving PHY is not capable of, the host would examine not only the separate data storage locations, but also all of the first locations, to identify all of the EEE capabilities of all of the link-partner PHYs. The host could then use that information to rearrange its network, by directing certain of its local PHYs, with better EEE capabilities, to establish links with specific remote PHYs, in place of existing links where the local PHYs cannot take advantage of the EEE capabilities of the remote PHYs.

Figure 1:
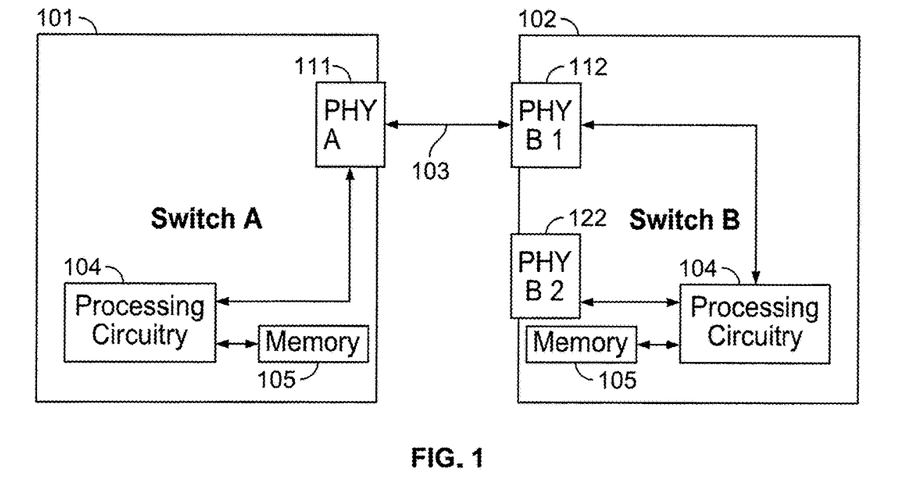
FIG. 1 is a block diagram of an environment in which the subject matter of this disclosure may be used.

FIG. 1 is a block diagram of a data networking environment 100 in which the subject matter of this disclosure is suitably used. Environment 100 includes two switches 101 and 102, each of which acts as a "host" of the type referred to above. As shown, Switch A (101) has one PHY 111 (PHY A), while Switch B (102) has two PHYs 112 (PHY B1) and 122 (PHY B2). The PHYs 111, 112, 122 that are shown are the minimum necessary to illustrate the subject matter of this disclosure. In fact, each switch 101, 102 may have any number of additional PHYs that are not shown. Moreover, while in the discussion that follows, Switch B (102) and PHYs 112 (PHY B1) and 122 (PHY B2) are considered the local host and local PHYs (respectively), and Switch A (101) and PHY 111 (PHY A) are considered the remote host and remote PHY (respectively) on a link between PHY 111 (PHY A) and one of PHYs 112, 122 (PHY B1, PHY B2), Switch A (101) may be considered to be the local host relative to its PHYs including PHY A (111) and other PHYs (not shown), and Switch B (102) and PHYs 112, 122 (PHY B1, PHY B2) may be considered the remote host and PHYs. However, separate discussion of that latter scenario is not necessary, as the operation may be understood by interchanging the labelling of switches 101 and 102, and similarly interchanging the labelling of PHY 111 (and any unseen additional PHYs of switch 101) and PHYs 112, 122.

Turning to the scenario where Switch B (102) and PHYs 112 (PHY B1) and 122 (PHY B2) are considered the local host and local PHYs (respectively), and Switch A (101) and PHY 111 (PHY A) are considered the remote host and remote PHY (respectively), one can consider a situation where PHY 111 (PHY A) supports EEE at any of 100 Mbps, 1 Gbps, 2.5 Gbps, 5 Gbps and 10 Gbps, while PHY 112 (PHY B1) supports EEE at either of 100 Mbps and 1 Gbps (but not 2.5 Gbps and 5 Gbps) and PHY 122 (PHY B2) supports EEE at any of 100 Mbps, 1 Gbps and 2.5 Gbps (but not 5 Gbps).

In such a situation, it would be better, at least from an energy-efficiency perspective, for Switch A (101) and Switch B (102) to connect at 2.5 Gbps via PHY 111 (PHY A) and PHY 122 (PHY B2), than to connect via PHY 111 (PHY A) and PHY 112 (PHY B1), which presumably would be at 1 Gbps. However, in previously-known implementations, once a link 103 is established between PHY 111 (PHY A) and PHY 112 (PHY B1), assuming that those are the two PHYs of Switch A (101) and Switch B (102) that discover each other during the auto-negotiation process, PHY 112 (PHY B1) will have stored, in the appropriate register, only the fact that PHY 111 (PHY A) supports EEE at 100 Mbps and 1 Gbps (but not that PHY 111 (PHY A) supports EEE at 2.5 Gbps). Thus, when Switch B (102) queries its local PHYs (including PHY 112 (PHY B1)) to check the capabilities of remote PHYs on Switch A, with respect to PHY 111 (PHY A), Switch B 102 will not discover that Switch A (101), or at least PHY 111 (PHY A), is capable of operating an EEE link at 5 Gbps.

Therefore, in accordance with implementations of the subject matter of this disclosure, after a link has been established according to an existing protocol, such as 802.3az Layer-2 (L2) LLDP, each PHY on the link will send to any other PHY (usually there are only two PHYs on any given link) on the link a new LLDP TLV frame 200 (FIG. 2) according to the subject matter of this disclosure, specifying its EEE capabilities. As shown, new LLDP TLV frame 200 includes at least five fields 201-205, as follows.

Figure 2:
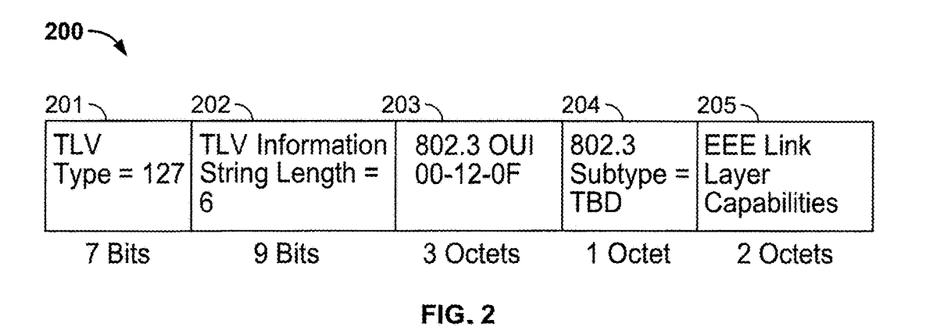
FIG. 2 is a schematic representation of a type-length-value frame according to implementations of the subject matter of this disclosure.

Field 201 in this implementation is a 7-bit field identifying the TLV type; in the example shown, the type identifier is '12710', representing IEEE 802.3. Field 202 in this implementation is a 9-bit field specifying the "information string length" of the frame (i.e., length, in bytes, of the particular TLV frame, excluding the type and length fields;

in this example, the information string length is 6). Field 203 in this implementation is a 3-octet (i.e., 24-bit) field identifying TLV frame 200 as an organizationally-unique identifier (OUI)—i.e., as proprietary (organizationally-unique identifiers are specified in Annex F of the IEEE 802.1AB-2009 standard that governs the Link-Layer Discovery Protocol). Field 204 in this implementation is a 1-octet (i.e., 8-bit) field identifying the 802.3 subtype of frame 200, which is determined by the 802.3 standards organization. Field 205 in this implementation is the data payload containing the information regarding EEE capabilities of the PHY that sends frame 200. In this example, field 205 is 2 octets (16 bits) long. Each bit represents the EEE capabilities of the sending PHY under a particular speed or speed/media-type combination. For example, a '1' in a particular bit may signify that the PHY is EEE-capable at the speed or speed/media-type combination represented by that particular bit, while a '0' in that particular bit may signify that the PHY is not EEE-capable at the speed or speed/media-type combination represented by that particular bit; the significance of a '1' or a '0' may be reversed in other examples or implementations.

In one example, the sixteen bits in field 205 represent EEE capabilities under nine speed/media-type combinations, with seven of the sixteen bits remaining unused, shown in the following Table 1:

TABLE 1

| EEE Link-Layer Capabilities | |
| --- | --- |
| Bit | Media type |
| 0 | 100BASE-TX |
| 1 | 1000BASE-T |
| 2 | 1000BASE-KX |
| 3 | XGXS (XAUI) |
| 4 | 10GBASE-KX4 |
| 5 | 10GBASE-KR |
| 6 | 10GBASE-T |
| 7 | 2.5GBASE-T |
| 8 | 5GBASE-T |
| 9-15 | RESERVED |

A '1' in any of the bit locations of Table 1 would signify that the sending PHY is EEE-capable under that speed/media-type combination, while a '0' in any of the bit locations of Table 1 would signify that the sending PHY is not EEE-capable under that speed/media-type combination.

An older receiving PHY, during auto-negotiation, may recognize EEE capabilities only under the following speed/media-type combinations (Table 2):

TABLE 2

| EEE Link-Layer Capabilities | |
| --- | --- |
| Bit | Media type |
| 0 | RESERVED |
| 1 | 100BASE-TX |
| 2 | 1000BASE-T |
| 3 | 10GBASE-T |
| 4 | 1000BASE-KX |
| 5 | 10GBASE-KX4 |
| 6 | 10GBASE-KR |
| 7-15 | RESERVED |

A '1' in any of the bit locations of Table 2 would signify that the receiving PHY is EEE-capable under that speed/media-type combination, while a '0' in any of the bit locations of Table 2 would signify that the receiving PHY is not EEE-capable under that speed/media-type combination.

An older receiving PHY having the capabilities in Table 2 would not recognize or identify the capabilities of the sending PHY in Table 1 to establish an EEE connection at 2.5 Gbps or 5 Gbps. The older PHY would not even know to provide a bit corresponding to those speeds. Therefore, during auto-negotiation, the older PHY under previously-known implementations would not store that information, and therefore the older PHY's host would not know that the sending PHY had those capabilities.

However, according to at least one possible implementation of the subject matter of this disclosure, the receiving PHY, regardless of the capabilities it recognizes (which may or may not be coextensive with its own capabilities), would store the information in Table 1, as received in a new LLDP TLV frame 200, as sent, after auto-negotiation, by the host of the sending PHY, in its entirety in a data storage location separate from the data storage location in which it stores the capabilities that the receiving PHY recognizes. The host of the receiving PHY would therefore be able to determine all capabilities of the sending PHY by examining that one data storage location.

Alternatively, according to at least one possible implementation of the subject matter of this disclosure, the receiving PHY would store the capabilities that the receiving PHY recognizes in the previously-known manner but, regardless of the capabilities that the receiving PHY recognizes (which may or may not be coextensive with its own capabilities), the receiving PHY would store, in a data storage location separate from the data storage location in which the receiving PHY stores the capabilities that the receiving PHY recognizes, those capabilities in Table 1, as received in a new LLDP TLV frame 200, as sent, after auto-negotiation, by the host of the sending PHY, that the receiving PHY does not recognize. Comparing Table 1 to Table 2, such a data storage location might store a Table 3 as follows:

TABLE 3

| EEE Link-Layer Capabilities | |
| --- | --- |
| Bit | Media type |
| 0 | 1000BASE-KX |
| 1 | XGXS (XAUI) |
| 2 | 2.5GBASE-T |
| 3 | 5GBASE-T |
| 4-15 | RESERVED |

This example would allow the host of the receiving PHY to recognize four speed/media-type combinations that the receiving PHY does not recognize, although only two of the four speed/media-type combinations present a speed improvement that the host might choose to exploit—2.5 Gbps or 5 Gbps.

According to such an implementation, in order to identify the capabilities of the sending PHY, the host of the receiving PHY would have to examine both the original data storage location that stores the capabilities recognized by the receiving PHY, and the separate data storage location that stores the capabilities not recognized by the receiving PHY. Moreover, the receiving PHY would have to perform additional processing to determine which of the capabilities of the sending PHY it already recognized and stored in the original data storage location, to determine which additional capabilities to store in the separate data storage location.

Figure 3:
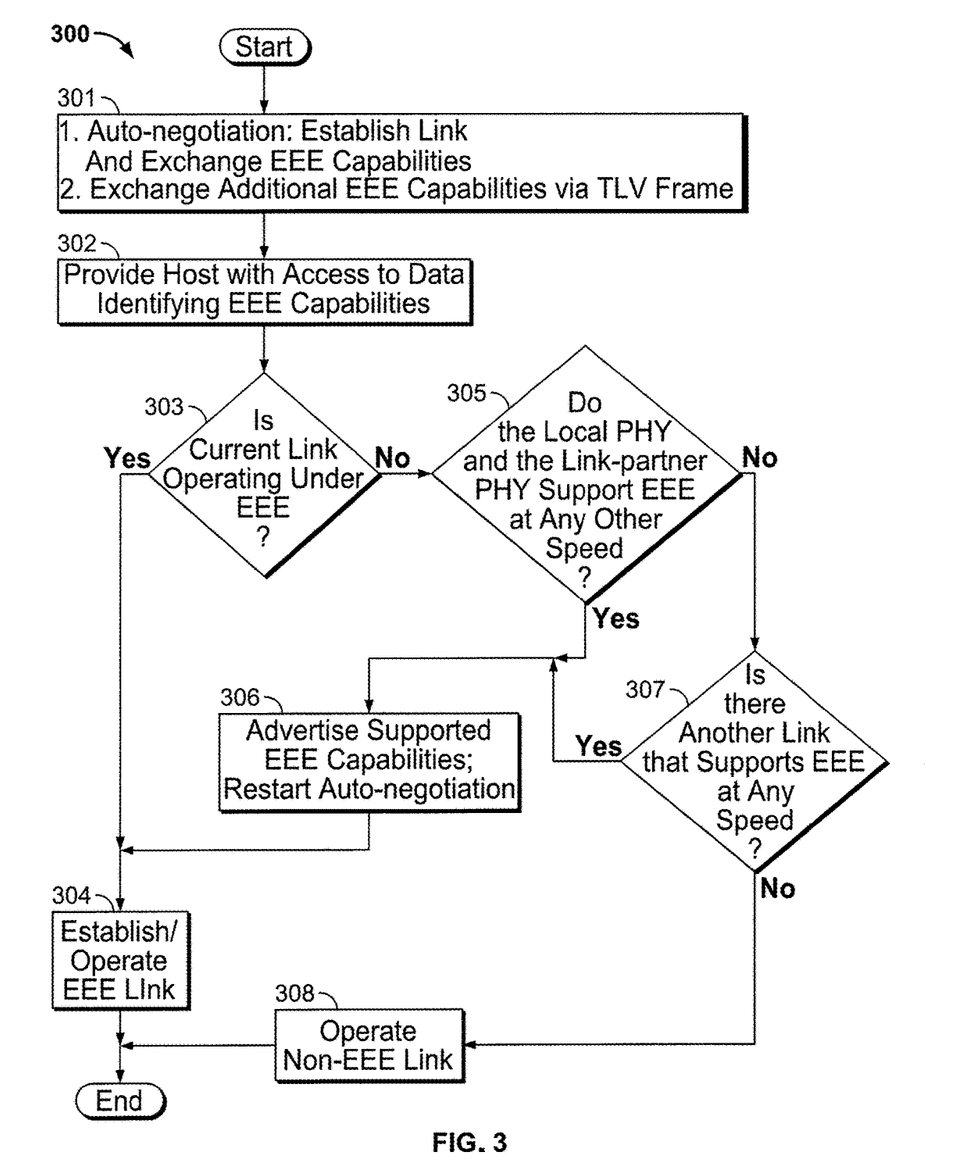
FIG. 3 is a flow diagram of an implementation of the operation of a system according to the subject matter of this disclosure.

FIG. 3 is a flow diagram that illustrates an example 300 of how a system including implementations of the subject matter of this disclosure would operate.

At 301, a local PHY and a remote PHY auto-negotiate a link according to known Layer 2 (L2) LLDP procedures. This auto-negotiation includes an exchange of EEE capabilities. The local PHY receives a listing of EEE capabilities of the remote PHY for speed/media-type combinations that the local PHY also is capable of. As part of the LLDP process, that listing is stored in a first data storage location, which is accessible to the local host. The local PHY also receives, from the host of the sending PHY, the new TLV frame described above in connection with FIG. 2 and Table 1, which identifies all EEE capabilities of the remote PHY, whether or not the local PHY shares those capabilities.

As described above, the new TLV frame is stored in whole or in part in a data storage location separate from the first data storage location, and accessible to the host. To be clear, although the data storage location is characterized herein, and in the claims which follow, as being "separate," that separateness refers to logical separateness. in some implementations the first data storage location and the logically separate data storage location may be located in separate physical storage devices. In other implementations, the first data storage location and the logically separate data storage location may be located in logically separate locations in the same physical storage device. Access to all data identifying EEE capabilities of remote PHYs is provided to the local host at 302.

At 303, the local host examines whether the link that has been established is an EEE-capable link. If so, the link operates at 304 in EEE mode, and method 300 ends. If, at 303, the link that has been established is not an EEE-capable link, then at 305 the local host examines whether the local PHY and the remote PHY support EEE at a speed other than the speed at which the current link was established. If so, then at 306 the auto-negotiation process 301-302 is restarted, including advertisement of a speed at which both the local PHY and the remote PHY support EEE, and leading to establishment and operation of an EEE link at 304, and method 300 ends.

If at 305 the local host determines that the local PHY and the remote PHY cannot support EEE at a speed other than the speed at which the current link was established, then at 307 the local host examines whether there may be another link that could support EEE (at any speed). That examination involves examining the EEE capabilities of the remote link-partner PHYs of all local PHYs connected to the local host, as previously stored, following negotiations of respective previous links, in the respective separate data storage location for each local PHY connected to the local host, as well as the capabilities of the local PHYs themselves.

If that examination at 307 reveals that there may be another link in the system that could support EEE, then at 306 the auto-negotiation process 301-302 is restarted, including advertisement of a speed at which at least one of the local PHYs and at least one of the remote PHYs support EEE, and leading to establishment and operation of an EEE link at 304, and method 300 ends. However, if the examination at 307 reveals that there is no other link available in the system that could support EEE, then at 308, the link that already has been established, without EEE, continues to operate, and method 300 ends.

By storing all of the EEE capabilities of the remote link partner PHYs, in implementations of the subject matter of this disclosure, the techniques described facilitate selection by the local host, for one or more links, of the most desirable link type (whether judged by speed or one or more other characteristics) that is also EEE-compliant, thereby optimizing speed and energy efficiency of the links.

Method 300 may be carried out by processing circuitry 104 of a host switch 101, 102. Processing circuitry 104 may be a microprocessor or microcontroller programmed with software or firmware for carrying out methods, such as method 300, according to implementations of the subject matter of this disclosure. Alternatively, processing circuitry 104 may be dedicated logic circuitry configured to carrying out methods, such as method 300, according to implementations of the subject matter of this disclosure. Processing circuitry 104 may have access to memory 105 where the separate data storage location may be located, or each separate data storage location may be located within its respective local PHY.

Thus it is seen that devices using a link-layer discovery protocol in which energy-efficient Ethernet capabilities are advertised, and systems including such devices, as well as methods of operating such devices and systems, have been provided.

As used herein and in the claims which follow, the construction "one of A and B" shall mean "A or B."

It is noted that the foregoing is only illustrative of the principles of the invention, and that the invention can be practiced by other than the described embodiments, which are presented for purposes of illustration and not of limitation, and the present invention is limited only by the claims which follow.

What is claimed is:

1. A method of operating an energy-efficient Ethernet transceiver system, the method comprising:
   establishing an initial link between a first local transceiver and a first remote transceiver at a remote host;
   receiving, at the first local transceiver, initial data from the first remote transceiver regarding energy-efficient Ethernet capabilities of the first remote transceiver;
   storing, in a first data storage location, the initial data from the first remote transceiver regarding energy-efficient Ethernet capabilities of the first remote transceiver that are shared by the first local transceiver;
   receiving, at the first local transceiver, additional data from the remote host regarding all energy-efficient Ethernet capabilities of the first remote transceiver; and
   storing, in a data storage location separate from the first data storage location, the additional data from the remote host regarding energy-efficient Ethernet capabilities of the first remote transceiver.

2. The method of claim 1 wherein the storing the additional data comprises storing the additional data from the remote host regarding all energy-efficient Ethernet capabilities of the first remote transceiver.

3. The method of claim 1 wherein the storing the additional data comprises storing the additional data from the remote host regarding energy-efficient Ethernet capabilities of the first remote transceiver that are not shared by the first local transceiver.

4. The method of claim 1 further comprising:
   determining, by a local host of the first local transceiver, whether the initial link is an energy-efficient Ethernet link; and
   when the initial link is determined not to be an energy-efficient Ethernet link, identifying, by the local host, based on at least the additional data, a remote transceiver that is capable of an energy-efficient Ethernet link and establishing, by the local host, of an energy-efficient Ethernet link with the identified remote transceiver.

5. The method of claim 4 further comprising:
storing, at at least one additional separate data storage location, other additional data from at least one other remote transceiver regarding energy-efficient Ethernet capabilities of the at least one other remote transceiver; wherein:
the identifying, by the local host, based on at least the additional data, a remote transceiver that is capable of an energy-efficient Ethernet link, comprises:
identifying, by the local host, based on at least the additional data and the other additional data, a remote transceiver from among the first remote transceiver and the first other remote transceiver, that is capable of an energy-efficient Ethernet link.

6. A method of operating an energy-efficient Ethernet transceiver system, the method comprising:
establishing an initial link between a first transceiver at a first host and a first transceiver at a second host;
receiving, at the first transceiver at the first host, first initial data from the first transceiver at the second host regarding energy-efficient Ethernet capabilities of the first transceiver at the second host;
receiving, at the first transceiver at the second host, second initial data from the first transceiver at the first host regarding energy-efficient Ethernet capabilities of the first transceiver at the first host;
storing, in a first data storage location at the first host, the first initial data from the first transceiver at the second host regarding energy-efficient Ethernet capabilities of the first transceiver at the second host that are shared by the first transceiver at the first host;
storing, in a second data storage location at the second host, the first initial data from the first transceiver at the first host regarding energy-efficient Ethernet capabilities of the first transceiver at the first host that are shared by the first transceiver at the second host;
receiving, at the first transceiver at the first host, first additional data from the second host regarding all energy-efficient Ethernet capabilities of the first transceiver at the second host;
receiving, at the first transceiver at the second host, second additional data from the first host regarding all energy-efficient Ethernet capabilities of the first transceiver at the first host;
storing, in a first additional data storage location at the first host separate from the first data storage location at the first host, the first additional data from the second host regarding energy-efficient Ethernet capabilities of the first transceiver at the second host; and
storing, in a second additional data storage location at the second host separate from the second data storage location at the second host, the second additional data from the first host regarding energy-efficient Ethernet capabilities of the first transceiver at the first host.

7. The method of claim 6 wherein the storing the first additional data comprises storing the first additional data from the second host regarding all energy-efficient Ethernet capabilities of the first transceiver at the second host.

8. The method of claim 6 wherein the storing the second additional data comprises storing the second additional data from the first host regarding all energy-efficient Ethernet capabilities of the first transceiver at the first host.

9. The method of claim 6 wherein the storing the first additional data comprises storing the first additional data from the second host regarding energy-efficient Ethernet capabilities of the first transceiver at the second host that are not shared by the first transceiver at the first host.

10. The method of claim 6 wherein the storing the second additional data comprises storing the second additional data from the first host regarding energy-efficient Ethernet capabilities of the first transceiver at the first host that are not shared by the first transceiver at the second host.

11. The method of claim 6 further comprising:
determining, by the first host, whether the initial link is an energy-efficient Ethernet link; and
when the initial link is determined not to be an energy-efficient Ethernet link, identifying, by the first host, based on at least the first additional data, a remote transceiver at the second host that is capable of an energy-efficient Ethernet link and establishing, by the first host, of an energy-efficient Ethernet link with the identified remote transceiver at the second host.

12. The method of claim 11 further comprising:
storing, at at least one other first additional separate data storage location, other first additional data from the second host regarding energy-efficient Ethernet capabilities of at least one other transceiver at the second host; wherein:
the identifying, by the first host, based on at least the first additional data, a remote transceiver at the second host that is capable of an energy-efficient Ethernet link, comprises:
identifying, by the first host, based on at least the first additional data and the first other additional data, a remote transceiver at the second host from among the first transceiver at the second host and the at least one other transceiver at the second host, that is capable of an energy-efficient Ethernet link.

13. The method of claim 6 further comprising:
determining, by the second host, whether the initial link is an energy-efficient Ethernet link; and
when the initial link is determined not to be an energy-efficient Ethernet link, identifying, by the second host, based on at least the second additional data, a remote transceiver at the first host that is capable of an energy-efficient Ethernet link and establishing, by the second host, of an energy-efficient Ethernet link link with the identified remote transceiver at the first host.

14. The method of claim 13 further comprising:
storing, at at least one other second additional separate data storage location, other second additional data from the first host regarding energy-efficient Ethernet capabilities of at least one other transceiver at the first host; wherein:
the identifying, by the second host, based on at least the second additional data, a remote transceiver at the first host that is capable of an energy-efficient Ethernet link, comprises:
identifying, by the second host, based on at least the second additional data and the second other additional data, a remote transceiver at the first host from among the first transceiver at the first host and the at least one other transceiver at the first host, that is capable of an energy-efficient Ethernet link.

15. An energy-efficient Ethernet transceiver system comprising:
a first host having a first transceiver and at least one other first transceiver; and a second host having a second transceiver and at least one other second transceiver; wherein:

each respective one of the first transceiver, the at least one other first transceiver, the second transceiver and the at least one other second transceiver, has a respective set of energy-efficient Ethernet capabilities;

each respective one of the first transceiver and the at least one other first transceiver has a respective first data storage location for storing initial data received from a respective one of the second transceiver and the at least one other second transceiver, regarding energy-efficient Ethernet capabilities of the respective one of the second transceiver and the at least one other second transceiver that the respective one of the first transceiver and the at least one other first transceiver also is capable of;

each respective one of the second transceiver and the at least one other second transceiver has a respective second data storage location for storing initial data received from a respective one of the first transceiver and the at least one other first transceiver, regarding energy-efficient Ethernet capabilities of the respective one of the first transceiver and the at least one other first transceiver that the respective one of the second transceiver and the at least one other second transceiver also is capable of;

each respective one of the first transceiver and the at least one other first transceiver has a respective first additional data storage location for storing additional data received from the second host, regarding energy-efficient Ethernet capabilities of a respective one of the second transceiver and the at least one other second transceiver, regardless of whether the respective one of the first transceiver and the at least one other first transceiver also has those capabilities; and each respective one of the second transceiver and the at least one other second transceiver has a respective second additional data storage location for storing additional data received from the first host, regarding energy-efficient Ethernet capabilities of a respective one of the first transceiver and the at least one other first transceiver, regardless of whether the respective one of the second transceiver and the at least one other second transceiver also has those capabilities.

16. The energy-efficient Ethernet transceiver system of claim 15, wherein:

the first host comprises first processing circuitry; and when an initial link is established between (a) one of (1) the first transceiver and (2) one of the at least one additional first transceiver at the first host, and (b) one of (1) the second transceiver and (2) one of the at least one additional second transceiver at the second host:

the first processing circuitry of the first host:

determines whether the initial link is an energy-efficient Ethernet link; and when the initial link is determined not to be an energy-efficient Ethernet link, identifies, based on at least the first additional data, a remote transceiver at the second host that is capable of an energy-efficient Ethernet link, and establishes an energy-efficient Ethernet link with the identified remote transceiver at the second host.

17. The energy-efficient Ethernet transceiver system of claim 16, wherein the first processing circuitry of the first host bases identification of the remote transceiver at the second host also on other first additional data from another of the at least one other second transceiver.

18. The energy-efficient Ethernet transceiver system of claim 15, wherein:

the second host comprises second processing circuitry; and when an initial link is established between (a) one of (1) the first transceiver and (2) one of the at least one additional first transceiver at the first host, and (b) one of (1) the second transceiver and (2) one of the at least one additional second transceiver at the second host:

the second processing circuitry of the second host:

determines whether the initial link is an energy-efficient Ethernet link; and when the initial link is determined not to be an energy-efficient Ethernet link, identifies, based on at least the second additional data, a remote transceiver at the first host that is capable of an energy-efficient Ethernet link, and establishes an energy-efficient Ethernet link with the identified remote transceiver at the first host.

19. The energy-efficient Ethernet transceiver system of claim 18, wherein the second processing circuitry of the second host bases identification of the remote transceiver at the second host also on other second additional data from another of the at least one other first transceiver.

20. The energy-efficient Ethernet transceiver system of claim 15, wherein:

the first host comprises first processing circuitry;

the second host comprises second processing circuitry; and when an initial link is established between (a) one of (1) the first transceiver and (2) one of the at least one additional first transceiver at the first host, and (b) one of (1) the second transceiver and (2) one of the at least one additional second transceiver at the second host:

a respective one of (a) the first processing circuitry of the first host, and (b) the second processing circuitry of the second host:

determines whether the initial link is an energy-efficient Ethernet link; and when the initial link is determined not to be an energy-efficient Ethernet link, identifies, based on at least a respective one of the first additional data and the second additional data, a remote transceiver, at a respective one of the second host and the first host, that is capable of an energy-efficient Ethernet link, and establishes an energy-efficient Ethernet link with the identified remote transceiver at the respective one of the second host and the first host.

* * * * *